J. F. STOEFFLER.
DRAFT APPARATUS.
APPLICATION FILED JUNE 25, 1908.
917,375.
Patented Apr. 6, 1909.
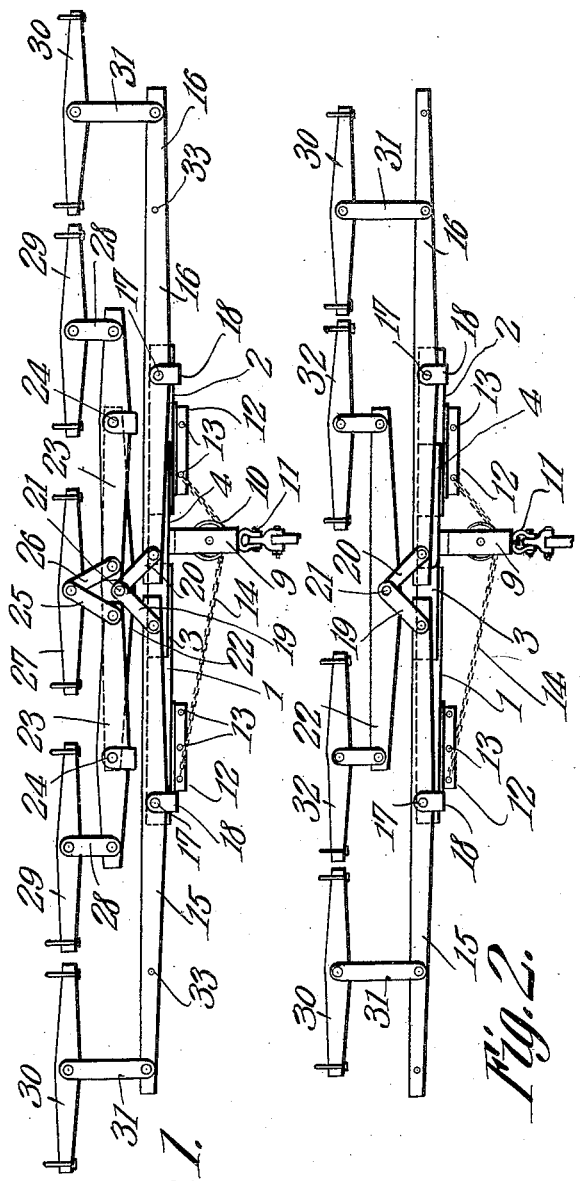
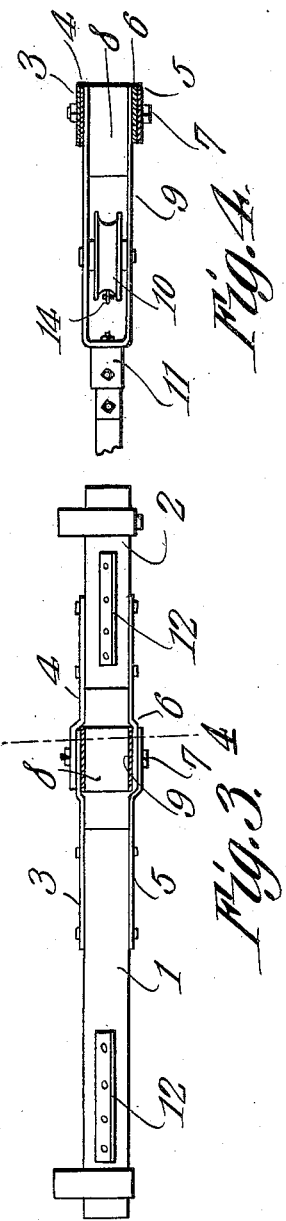
Inventor
John F. Stoeffler.
Witnesses
By C. A. Snow & Co.,
Attorneys

UNITED STATES PATENT OFFICE.

JOHN F. STOEFFLER, OF WEST UNION, IOWA.

DRAFT APPARATUS.

No. 917,375.  Specification of Letters Patent.  Patented April 6, 1909.

Application filed June 25, 1908. Serial No. 440,403.

*To all whom it may concern:*

Be it known that I, JOHN F. STOEFFLER, a citizen of the United States, residing at West Union, in the county of Fayette and State of Iowa, have invented a new and useful Draft Apparatus, of which the following is a specification.

This invention relates to draft apparatus, and has for its object to provide a device of this class which shall be simple, efficient, of few parts and readily changed to adapt it for use by four or five horses without employing additional parts.

To these and other ends, the invention consists of the novel combination and arrangement of parts hereinafter described and claimed and illustrated in the accompanying drawing, in which:—

Figure 1 is a plan view of the draft apparatus for five horses; Fig. 2 is a similar view of the device adjusted for four horses; Fig. 3 an enlarged rear view of the two-part draft beam, and Fig. 4 a sectional view on the line 4—4 of Fig. 3.

Like reference characters are used for the same parts in all the figures.

In the drawing, the main draft beam is in two parts a relatively long portion 1 and a shorter portion 2, substantially in line with each other and spaced apart, but pivotally joined by means of overlapping straps 3 and 4 above the beams and 5 and 6 below them, and a vertical pivot pin or bolt 7 passing therethrough and through a spacing block 8 between the upper and lower straps. Also pivoted on the pin or bolt 7 is a U-shaped yoke member 9 extending rearwardly from the main beam and provided with a grooved pulley 10 between the arms of said yoke and a clip 11 swiveled in the end of the same for connecting the apparatus to the beam of a plow or other implement.

Bolted on the rear side of each beam member 1 and 2 is an angle plate 12 or other form of bracket provided with a longitudinal series of holes 13, in one of which holes in each angle plate the ends of a chain 14, after passing over the pulley or sheave 10, are fastened. The ends of the chain may be moved from one hole to another when necessary. An evener bar 15 is pivotally connected to the outer end of the beam member 1 by a bolt 17 and a supporting clip 18. A similar evener bar 16 is mounted in like manner on the outer end of the beam member 2. The inner ends of the evener bars 15 and 16 which are in close proximity are attached by links 19 and 20, through the medium of a pivot bolt 21, to the center of a double-tree 22, which supports on each outer end an evener bar 23 by means of pivot pins or bolts 24, and the inner end of each evener bar 23 is coupled by links 25 and 26 to a swingle tree 27. Links 28 connect the outer ends of the evener bars 23 to swingletrees 29 while swingletrees 30 are attached in a similar manner by links 31 to the outer ends of the evener bars 15 and 16. The inner ends of the evener bars 23 are, between pivotal points, twice as long as their outer ends whereas the outer ends of the evener bars 15 and 16 are one and one-half times the length of their inner ends.

When the draft apparatus is arranged for four horses, the two evener bars 23 are disconnected from the double-tree 22 and swingletrees 32 substituted in their place. Also, the swingle-trees on the outer ends of the evener bars 15 and 16 are uncoupled and moved inwardly to the holes 33 which are the same distance from the axes of the pivot bolts 17 as the pivots of the links 19 and 20.

From the above it will be seen that the draft apparatus is simple, easily changed for the use of four or five horses, and very efficient in operation, as all the draft animals will be kept at their work to the greatest advantage.

What is claimed is:—

A device of the class described comprising a main beam formed of mating sections of unequal lengths having their inner ends spaced apart, connecting plates secured to the upper and lower longitudinal edges of the beam sections and having their free ends over-lapped, a spacing member interposed between the over-lapped ends of the connecting plates, a yoke extending laterally from one side of the main beam and bearing against the spacing member, a pivot pin passing through the spacing member, yoke and over-lapped ends of the connecting plates, perforated angle bars secured to the sections of the main beam, one on each side of the yoke, a pulley journaled in said yoke, a flexible element passing over the pulley and extended through the adjacent perforations in the angle bars, an evener bar pivoted on the outer end of each beam section, a draft bar disposed at the juncture of the connecting plates and arranged in spaced relation to the main beam, links forming a pivotal connection between the draft bar and the inner ends of the evener bars, swingle trees secured to the evener bars and draft bar, respectively, and a draft device secured to the free end of the yoke.

In testimony that I claim the foregoing as my own, I have hereto affixed my signature in the presence of two witnesses.

JOHN F. STOEFFLER.

Witnesses:
HOWARD WEED,
W. A. DORLEND.